April 19, 1932.  J. NAGY  1,854,482
PISTON RING
Filed Aug. 11, 1930
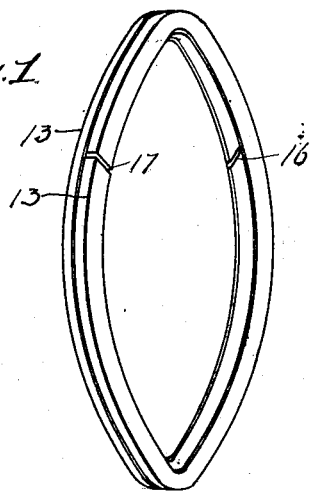
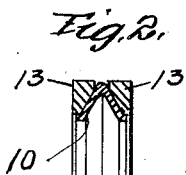
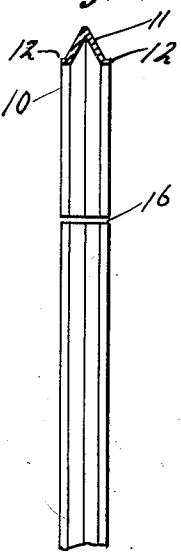
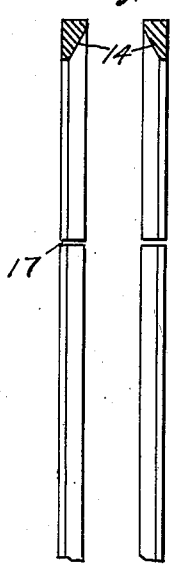
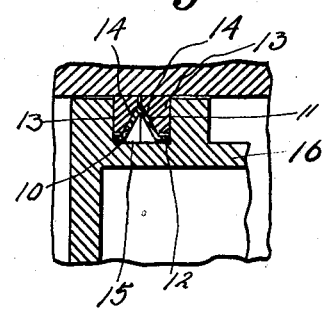
Inventor
Joseph Nagy
By W. W. Williamson
Atty.

Patented Apr. 19, 1932

1,854,482

UNITED STATES PATENT OFFICE

JOSEPH NAGY, OF PHILADELPHIA, PENNSYLVANIA

PISTON RING

Application filed August 11, 1930. Serial No. 474,349.

My invention relates to new and useful improvements in piston rings and has for its object to so construct such a ring that when fitted in the groove of a piston, it will be expanded sidewise so as to snugly fit the side walls of the grooves and also be expanded upward so as to firmly bear against the inner wall of the cylinder in which the piston is located.

A further object of the invention is to form the ring in two sections, each section being in the form of a split ring and having a beveled or inclined surface thereon so that when placed upon a spring split ring having corresponding beveled or inclined surfaces, the expansion of the spring ring will force the sections of the spring ring, both outward and sidewise.

With these and other ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawings forming a part of this application, in which:—

Fig. 1 is a perspective view of a piston ring made in accordance with my invention.

Fig. 2 is an enlarged section of a portion of Fig. 1.

Fig. 3 is a view similar to Fig. 2, showing a portion of the split spring ring, the sections of the expansion ring being omitted.

Fig. 4 is a section of a portion of the two sections of the expansion ring removed from the spring ring.

Fig. 5 is a section of a portion of a piston and cylinder showing the application of one of the piston rings in one of the grooves in the piston.

In carrying out my invention as herein embodied, 10 represents a split spring ring, the cross section of its periphery being wedge-shaped, as indicated at 11, so as to provide two inclined surfaces, this ring also has the shoulders 12 formed thereon for the purpose hereinafter explained.

13 represents the two sections of the expansion ring having beveled inclined surfaces 14 formed therein corresponding to the inclined surfaces 11 of the spring ring so that when the device is assembled, the surfaces 14 ride upon the surfaces 11 and when thus assembled before being placed in a groove 15 of a piston 16, the expansion sections will rest upon the shoulders 12 for convenience in installation, handling, and shipping, but when the ring is placed in a groove in the piston, the expansion sections will be slightly forced toward each other in slight degree by the side walls of the groove, thus causing these sections to ride up the inclined surfaces 11 thereby lifting these sections from off the shoulders 12, it being understood that all of these movements are very small since in practice, the piston is made to have a running fit within the cylinder and but little movement of the expansion sections serves to keep the outer surfaces thereof in snug contact with the inner surface of cylinder. The spring ring is split, as indicated at 16 and the expansion sections are split as indicated at 17 so that the three sections of the ring coact with each other and with the side walls of the groove in the piston to make a perfect backing under spring tension thereby preventing undue wear upon the inner surface of the cylinder or the scoring thereof.

In practice, it has been found that this construction of a two-way expansion ring permits the expansion section to be made of relatively soft material, such as brass or aluminum, thus lessening the wear upon the inner surface of the cylinder.

Rings made in accordance with my improvements are simple and cheap of construction, being more durable and therefore effect a considerable saving in repair.

Of course I do not wish to be limited to the exact details of construction as herein shown, as these may be varied within the limits of the appended claim without departing from the spirit of my invention.

Having thus fully described by invention, what I claim as new and useful is:—

A device of the character described consisting of a split spring ring including two integral walls diverging toward their free edges and shoulders projecting from the outer surfaces of said walls at the free edges and a pair of split ring sections mounted on the outside of said walls for coaction with the shoulders.

In testimony whereof, I have hereunto affixed my signature.

JOSEPH NAGY.